United States Patent Office 2,950,980
Patented Aug. 30, 1960

2,950,980

ADHESIVE COMPOSITIONS

Arthur Hirsch, 831 Linden Ave., Elizabeth, N.J.

No Drawing. Filed Sept. 10, 1958, Ser. No. 760,073

1 Claim. (Cl. 106—125)

The present invention relates to a novel adhesive composition and is particularly concerned with an adhesive which produces a film which is dry and non-tacky under room temperature conditions, but which becomes tacky and highly adhesive upon the subsequent application of heat or moisture.

It is an object of this invention to produce an adhesive which may be applied to tapes, labels, cartons, and other surfaces, and which will dry to a film so non-tacky as to permit storage or shipment of products provided with such adhesive film in stacked or rolled form without incurring blocking—that is, temporary or permanent adhesion to adjacent portions. A further object of this invention is to produce an adhesive which when applied as aforementioned and after subsequent drying thereof, may be reactivated by either heat or moisture. Still further objects of this invention will become apparent from the description hereinafter.

Adhesives which can be reactivated by remoistening with water are well known. Such adhesives can be compounded from starches, dextrins, animal glues, etc., either separately or in conjunction with one another and further formulated with various additives and modifiers. It is, furthermore, well known that certain resinous adhesives can be reactivated by heat. A combination of these properties in one adhesive would enable the ultimate user to choose a method of reactivation most suitable to his needs. Such an adhesive which could be reactivated by either heat or remoistening would permit the consumer to alternate his method of reactivation while retaining the same adhesive.

It is, furthermore, well known that animal glue must be formulated with humectants in order to reduce the curl effect in a dried film or coating of same. Said humectants may be chosen from glycerine, glycols, sugars, inorganic salts, urea and others, as is well known in the arts. The following data illustrate suitable adhesive formulations:

|  | Parts by Weight | | |
| --- | --- | --- | --- |
|  | Glue | Urea | Water |
| Example A | 50 |  | 50 |
| Example B | 48½ | 3½ | 48½ |
| Example C | 46⅔ | 6⅔ | 46⅔ |
| Example D | 45 | 10 | 45 |
| Example E | 43⅓ | 13⅓ | 43⅓ |
| Example F | 41⅔ | 16⅔ | 41⅔ |
| Example G | 40 | 20 | 40 |
| Example H | 38⅓ | 23⅓ | 38⅓ |
| Example I | 36⅔ | 26⅔ | 36⅔ |
| Example J | 35 | 30 | 35 |
| Example K | 33⅓ | 33⅓ | 33⅓ |

Adhesive coatings formulated as above, show significant differences in appearance and important adhesive properties as tabulated herewith and summarized in Table 1:

Table 1

|  | Adhesion in McLaurin Units | Curl | Blocking | Heat Sealable |
| --- | --- | --- | --- | --- |
| Example A | 36 | + | − | − |
| Example B | 48 | + | − | − |
| Example C | 61 | + | − | − |
| Example D | 77 | − | − | − |
| Example E | 85 | − | − | +/− |
| Example F | 83 | − | +/− | + |
| Example G | 64 | − | + | + |
| Example H | 65 | − | + | + |
| Example I | 44 | − | + | + |
| Example J | 38 | − | + | + |
| Example K | 37 | − | + | + |

The proportion of humectants employed is of importance as can be seen from Table 1. Thus formulations composed of a water solution of animal bone or hide glue and urea, containing less than 8⅓% of urea, when coated and dried on tapes or labels or the like, give rise to considerable curl (see Examples A to C). There the urea concentration exceeds 16⅔% (Example F), blocking in the finished product can be observed. Careful examination of Table 1, will reveal a range of urea concentration which is most desirable, resulting in an adhesive layer which upon drying neither curls nor blocks. Table 1, furthermore, reveals the newly uncovered wholly unexpected fact that urea concentrations in excess of 13⅓%, result in a heat sealable or heat reactivatable adhesive. It was wholly unexpected to find a range of urea concentrations as defined by Formulae E and F which would combine good heat sealability, good remoistenability and no curl. A preferred formulation according to this invention would consist of:

EXAMPLE L

Parts by weight
Glue _____ 42–43
Urea _____ 13–16
Water _____ 42–44

It is, however, well understood that a portion of the animal glue, not to exceed 15 parts, may be replaced by extenders or fillers, such as starches, dextrins, clays and others, without substantially effecting the basic character of this adhesive composition.

It can thus be seen that there has been provided in accordance with the invention an adhesive composition which in dry state forms a film and consists of animal glue and urea in a ratio from about 2.6:1 up to 3.3:1, said glue and urea forming about 50 to 60 percent of solids in a water dispersion.

Such adhesive composition when applied to a base such as paper adheres thereto, remains nontacky at room temperature and at ordinary atmospheric conditions and is capable of being either remoistened with water or may be activated upon application of heat to such said coating.

Various changes and modifications may be made without departing from the spirit and scope of the present invention and it is intended that these modifications and changes be embraced by the annexed claims.

Having thus described the invention, what is claimed as new and desired to be secured by Letters Patent is:

I claim:

An adhesive composition for application to paper and like nonrigid base; comprising a dry, solid film derived from a water dispersion with a concentration of from 50% to 60% of solids, consisting of animal glue amounting to 42 to 43 parts by weight and urea ranging from about 13 to about 16 parts by weight, said film being reactivatable by moistening, as well as by application of heat, selectively, and substantially avoiding curling of said base.

References Cited in the file of this patent

UNITED STATES PATENTS 1,950,483    Christopher et al. _____ Mar. 13, 1934